United States Patent [19]

Nakamoto et al.

[11] 4,125,846
[45] Nov. 14, 1978

[54] ELECTRONIC EXPOSURE CONTROL APPARATUS

[75] Inventors: Soichi Nakamoto, Machida; Fumio Ito, Yokohama; Yasuo Isobe, Kawasaki; Tadashi Ito, Yokohama, all of Japan

[73] Assignee: Canon Kabushiki Kaisha, Tokyo, Japan

[21] Appl. No.: 717,669

[22] Filed: Aug. 25, 1976

Related U.S. Application Data

[63] Continuation-in-part of Ser. No. 668,720, Mar. 19, 1976, abandoned, which is a continuation of Ser. No. 446,758, Feb. 28, 1974, abandoned.

[30] Foreign Application Priority Data

Mar. 7, 1973 [JP] Japan .................................. 48/26695
Apr. 26, 1973 [JP] Japan .................................. 48/47902
Apr. 26, 1973 [JP] Japan .................................. 48/47904

[51] Int. Cl.² .............................................. G03B 7/08
[52] U.S. Cl. .................................. 354/23 D; 354/24; 354/60 A
[58] Field of Search ...................... 354/23 D, 24, 60 A

[56] References Cited

U.S. PATENT DOCUMENTS

| 3,703,130 | 11/1972 | Watanabe | 354/23 D |
| 3,748,979 | 7/1973 | Wada | 354/23 D |
| 3,824,608 | 7/1974 | Toyoda | 354/23 D |
| 3,928,858 | 12/1975 | Sakurada et al. | 354/23 D |

FOREIGN PATENT DOCUMENTS 2,509,593 9/1975 Fed. Rep. of Germany ............. 354/24
2,518,049 10/1975 Fed. Rep. of Germany ........ 354/23 D

*Primary Examiner*—Russell E. Adams
*Attorney, Agent, or Firm*—Toren, McGeady and Stanger

[57] ABSTRACT

An electronic exposure control apparatus for a camera includes a setting means to set the exposure factor, a compression means connected to said setting means, for compressing the above-mentioned exposure factor logarithmically and an analogue-digital conversion means, being connected to said compression means, and generating a pulse number which corresponds to the output from the compression means. Also included is a first counter, which is connected to the output of the above-mentioned analogue-digital conversion means, for counting the pulse number from the above-mentioned analogue-digital conversion means, a pulse generating means, a binary counter having plural number of bits and connected to the output of the above-mentioned pulse generating means, wherein said counter counts the pulse number from the above-mentioned pulse generating means in association with shutter release, and the output of the counter is connected to the first counter for resetting the memorized content of the first counter. A coincidence detection means is connected to the output of the binary counter, wherein said means generates a signal when the memorized content of the first counter is reset, and a control means is connected to the above-mentioned coincidence detection means, wherein the opening and closing of the shutter is controlled by the signal from the above-mentioned coincidence detection means.

1 Claim, 2 Drawing Figures

ELECTRONIC EXPOSURE CONTROL APPARATUS

CROSS REFERENCE TO RELATED APPLICATIONS

This is a continuation-in-part application of applicants' copending U.S. application Ser. No. 668,720 filed Mar. 19, 1976 which, in turn, was a Continuation of U.S. application Ser. No. 446,758 filed Feb. 28, 1974 both now abandoned.

BACKGROUND OF THE INVENTION

1. Field Of The Invention

The present invention is related to an electronic exposure control apparatus of a single lens reflex camera, particularly to an electronic exposure control apparatus having an electronic shutter formed by a digital circuit which is digitally extended using the register.

2. Description of The Prior Art

In a conventional single lens reflex camera when an automatic exposure control is done by TTL photosensing, since photo-sensing is suspended during exposure of camera, as is well known, the brightness of an object just before exposure is detected and memorized and exposure control is performed based on this memorized value. And as such a device, a capacitor is used as a means to memorize the brightness of an object and the analogue amount of charged voltage at said capacitor is memorized. In another type, a register formed by flip-flop circuit is used to memorize the brightness as a digital amount.

In the former method in which a capacitor is used to memorize analogue amount, the brightness of an object being electrically converted is compressed to several volts or less using a compression diode and is memorized with the use of a power source battery which is ordinarily used. Particularly in said device, a circuit to convert said memorized voltage to exposure time is an analogue circuit using a semiconductor. Therefore, said device has such shortcomings that it is apt to be influenced by temperature variation and variation in power source voltage and the memorized voltage can not be converted to proper exposure time. In addition, even when a compensation circuit, etc. is provided, said influence can not be sufficiently compensated.

On the other hand, a method to digitally memorize an object information using a register is disclosed in the Japanese Patent Publication No. Sho 45-4903, and in said method as the object information is digitally memorized in a register it will not be influenced by temperature variation and power source voltage variation. However, since the object information is memorized in a register in compressed manner for reducing the number of bits in the register, the output of the register needs to be expanded to convert what is memorized in the register to exposure time. But, as a circuit for said expansion purpose is an analogue circuit it is apt to be affected by temperature variation, power source voltage variation as in the former case, and it is difficult to obtain correct exposure time.

SUMMARY OF THE PRESENT INVENTION

An object of the present invention is to provide a device in which the above-mentioned shortcomings are eliminated, thus to provide an electronic shutter to digitally expand the content of the register memorizing the object brightness information being compressed.

Another object of the present invention is to provide an electronic shutter in which an indication means is connected to an output end of the expansion circuit to digitally expand the content of the register.

Still another object of the present invention will be apparent from the detailed explanations in which the invention is explained together with the drawings.

DESCRIPTION OF THE EMBODIMENTS OF THE INVENTION

Figure 1:
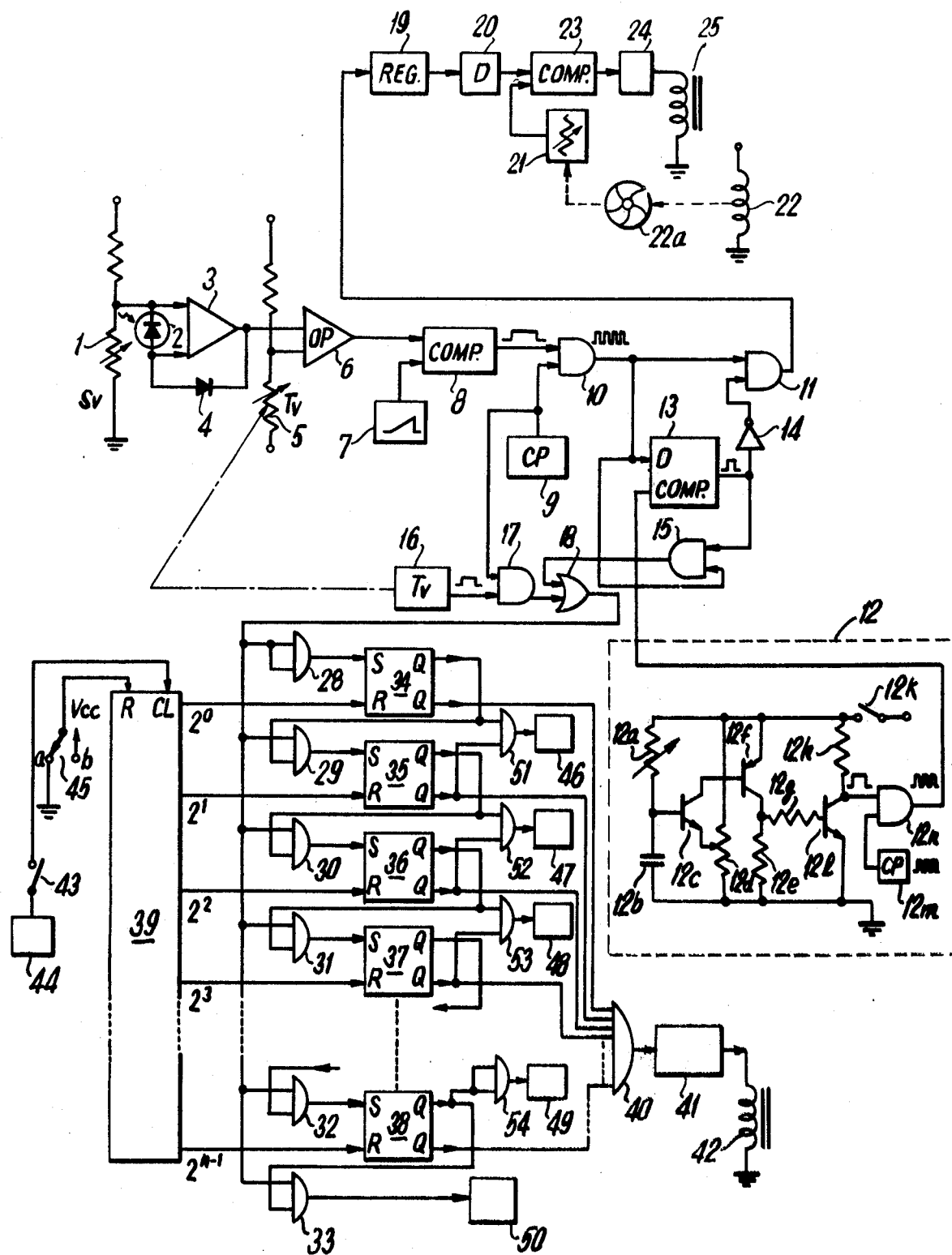
FIG. 1 is a block diagram to show one example of an electronic exposure control apparatus of the present invention.

FIG. 1 is a block diagram to shown an example of an electronic shutter control device of the present invention. In this figure, 1 is a variable resistor adjustable for film sensitivity, 2 is a light receiving element such as a CdS, silicon blue-cell (SBC), etc., to receive the light from an object and output photo-current 3 is an operational amplifier to which the output terminal of said light receiving element is connected, 4 is a diode having compressive characteristics being connected between the input terminal and the output terminal of the operational amplifier 3, 5 is a variable resistor varied by setting shutter time, 6 is a second operational amplifier being connected to the output terminal of the above-mentioned operational amplifier and the shutter time setting variable resistor 5, 7 is an integration waveform generator, 8 is a comparator to compare the outputs of the above-mentioned operational amplifier 6 and of the integration waveform generator 7 and to generate such pulse length as corresponds to such length of time required until the outputs of 6 and 7 coincide, 9 is a clock pulse generator and the oscillated frequency thereof can be varied, 10 is an AND gate, and such pulse number as corresponds to a proper diaphragm aperture value will be generated at its output, 11 is an AND gate, 12 is a generator which generates a pulse number corresponding to the limit value of the diaphragm aperture of a taking-lens (not shown) used in a camera (herein called as a limit diaphragm value), for example $F = 1.4$, and this generator 12 has various elements as shown in FIG. 1, e.g. a resistor 12a to be set at a resistance value corresponding to the limit diaphragm value, a capacitor 12b forming a time constant circuit together with the resistor 12a, a npn type transistor 12c which becomes conductive when the output voltage of the time constant circuit reaches a present value, a standard value setting resistor 12d, a pnp type transistor 12l, a resistor 12e, 12q, 12h, a power source switch 12k, a clock pulse generator 12m and AND gate 12n. The generator 12 generates a pulse number from the output terminal or AND gate corresponding to the limit diapragm value because it is non-conductive for a period of time corresponding to the resistance value set in the resistor 20 by the transistor 12l, 13 is a comparator circuit which compares the outputs of AND gate 10 and the generator 12 and is constituted, for example, by an up-down counter. 14 is a NOT gate which inverts the input and the output of this circuit and is connected to the other input of said AND gate. 15 is an AND gate which passes the output pulse generated from the AND gate 10 after the output of said comparator 13 becomes 1. 16 is a pulse generator which generates a pulse with such pulse length as corresponds to shutter time information by setting of shutter time, and is composed of each of the above-mentioned circuits 5, 6, 7 and 8. 17 is an AND gate having familiar function as that of the above-mentioned AND gate 10. 18 is an OR gate, 19 is a register connected to the AND gate 11. 20 is a D-A converter which makes the conversion to the amount of current which corresponds to the number of pulses of the register 19. 21 is a variable resistance which is varied in association with a diaphragm driving mechanism 22 of a camera. Element 22 may be a spring, for example. Element 22a itself a camera diaphragm. 23 is a comparator to compare the outputs of the D-A converter 20 and of the variable resistance 21 and generates a pulse when both outputs coincide. 24 is a switching circuit such as a Schmitt circuit, etc. having its output state inverted by the output of the comparator 23. 25 is an electromagnet for locking the diaphragm driving member which is excited by 24. Here, the above-mentioned variable resistances 5, 21 are resistances having logarithmic resistance variation corresponding to the set amount thereof. It is also possible to have the output of the register 19 drive the diaphragm by way of a conversion circuit and stepping motor.

In terms of representative circuit elements, comparator 13 is of the type shown in FIGS. 1, 3 and 4 of the German laid-open Specification No. 2,164,243 of July 29, 1972 which corresponds to U.S. Pat. No. 3,748,979. When the output terminal of AND gate 10 of the present invention is connected to the flip-flop 15 of DOLS No. 2,164,243 and the output terminal of the element 12 is connected to the input terminal of the flip-flop 5 of the above-mentioned DOLS, the desired function is achieved.

It should be noted that comparator 13 has the function of both register and comparator.

Register 19 is of the type disclosed as $B_0$, $B_1$, $B_2$, $B_3$, $B_4$ on Page 675 of *Pulse, Digital and Switching Waveforms* (published 1965, McGraw-Hill). Thus when the output terminal of AND gate 11 is connected to "T" of "$B_0$," the required connection is achieved. The register shown in *RCA Solid State Databook Series '72* type CD4014A may also be used.

D-A converter 20 is of the type disclosed in the McGraw-Hill text above (P.675).

Comparator 23 is of the type disclosed in "Voltage Comparators/Buffers . . . LM106/LM206" on Page 135 of *Linear Integrated Circuits* published in 1971 by National Semiconductor Corporation. Thus, by connecting the output terminal of element 20 of the present invention to the input terminal 2 of the element shown by a solid line on Page 135 of the above reference and by connecting the output terminal of the element 21 of the present invention to the other input terminal 3 of the reference and, further, by connecting the output 7 to the input terminal of the element 24, the desired interconnection is achieved.

The output of the OR circuit 18 is added to the plural number of AND gates 28 to 33. The outputs of the AND gates 28 to 33 are connected to the set terminals S of plural number of flip-flop circuits 34 to 28, respectively. The reset terminals R of these circuits 34 to 38 are connected to each of bits $2^0$, $2^1$ . . . of a binary counter 39. One of the output terminals Q at each of the circuits 34 to 38 is connected to the AND gate of the next stage, respectively, while the other output terminals $\overline{Q}$ are inputted to the AND gate circuit 40. The shutter time control circuit 41 composed by, for example, Schmitt circuit is actuated by the output of the circuit 40, and by the same, a shutter closing member is driven by a magnet 42. A reference pulse is added to the input terminal CL of the above-mentioned binary counter from a reference pulse generator 44 through a switch 43, and a reset switch 45 is connected to the reset input terminal R. The output of the AND gate 33 is connected to an overflow indication lamp circuit 50 while the outputs Q, $\overline{Q}$ of each flip-flop circuit are connected to indication lamp circuits 46 to 49 through AND gates 51 to 54.

Next, function of this device will be explained. First in a first state wherein there is no output pulse from the OR gate 18, the flip-flop circuits 34 to 38 are all reset and their outputs will be such that Q is "0", and $\overline{Q}$ is "1". As a shutter dial (not shown in the drawing) of a camera is rotated to set the same at a desired shutter time, shutter time information will be inserted into the resistance 5 in association therewith. As film sensitivity information is set at the resistance 1 beforehand, such voltage as corresponds to film sensitivity and object brightness information is outputted from the operation amplifier 3. Therefore, the output of the second operation amplifier 6 becomes such as corresponds to proper diaphragm aperture value. Of course, the output of the amplifier 6 is logarithmically compressed as the diode 4 and the resistance 5 with its resistance value varying logarithmically are used. For example, as a photosensing starting switch (not shown in the drawing) is actuated, integrated waveform which ascends linearly is outputted from 7, and at the same time the output of the comparator 8 becomes 1. As the output voltage of the generator 7 increases and becomes equal to the output of the amplifier 6, the output of the comparator 8 becomes again 0. By this operation, such pulse number, as is equal to the pulse number from the generator 9 being inputted while the output of the comparator 8 is 1, outputted from the AND gate 10. This pulse is mermorized in the register 19 through the AND gate 11. On the other hand, such pulse number as corresponds to the set shutter time is outputted from the AND gate 17 and its pulse train is transferred to the output of the OR gate 18.

The first one (first pulse) of said output pulse goes through the AND gate 28 and is impressed on the set input S of 34, and in the output of 28, Q is inverted to "1" and $\overline{Q}$ is inverted to "0". When the next output pulse (second pulse) is sent out, the AND gate 29 becomes ON by said pulse and the Q "1" pulse from 34 and the second pulse is inputted into the S input of 35. By this, 35 is inverted and Q becomes "1" while $\overline{Q}$ becomes "0". Then, thereafter, every time the output pulse from 18 is sent out, the flip-flop circuits will be set in turn in the order of 34, 35 . . . and as great a number of FF circuits as the number of output pulse will be set.

The output of the flip-flop circuits, which have been set according to the number of output pulse from the OR gate 18, as mentioned above, will be such that Q is "1" and $\overline{Q}$ is "0". Each of the $\overline{Q}$ outputs of the flip-flop circuits is inputted into the gate circuit 40 forming an AND gate so that the shutter time control circuit 41 is controlled by said output to actuate the magnet 42. But as the $\overline{Q}$ output of the flip-flop circuit being set by the output pulse from the OR gate 18 is then "0", the AND gate 40 under such state will be OFF and control signal will not be sent to the control circuit 41.

Next, the binary counter 39 is reset, for example, by having the switch 45 connected momentarily from terminal a to terminal b at the time of film windup. Therefore, in this state, the signal for the reset input R of each flip-flop circuit will not be sent from each output of the counter. When a shutter release button (not shown in the drawing) is pressed one step in this state, the pulse memorized in register 19 is converted into an analogue amount by the D-A converter 20 and is then supplied into the comparator 23. At the same time, the diaphragm driving member 22 is actuated to stop down the diaphragm 22a. As the diaphragm driving member 22 is actuated, the variable resistance 21 is varied in association therewith and such current as corresponding to the amount of rotation of the diaphragm will be inputted into one of the input terminals of the comparator 23. When the output current from the D-A converter 20 and the output current generated by the variable resistance 21 coincide, a pulse is generated by the comparator 23 and the magnet 25 is excited; thus the diaphragm driving member is locked. That is, it is always set at a desired diaphragm aperture value. When the shutter release button is further pressed down to a second step, the engagement of the shutter front screen is released. The switch 43 is turned ON at the same time the shutter front screen starts moving, and pulses with predetermined or periodic cycle will be sent to the binary counter 39 from the reference pulse generator 44.

For example, if the cycle of the reference pulse is selected as 1 mS (1/1000 second), reset signal is generated at first bit $2^0$ of the binary counter in 1/1000 second after the shutter front screen starts moving, and it is sent to the reset input of the flip-flop circuit 34 to reset the FF circuit. By this, the output Q is inverted to "0" and $\overline{Q}$ to "1". Reset signal will be sent successively to the reset input of the flip-flop circuit in such manner that the second bit $2^1$ of the binary counter circuit is after $1/1000 \times 2 = 1/500$ second and the third bit $2^2$ is after $1/1000 \times 2^2 = 1/250$ second .... When there are four output pulses from the OR gate 14, the circuits 34 to 37 are in a set state, and the flip-flop circuits in the stages thereafter will be in a reset state. In this state, as the output of the binary counter is resetting FF1 to FF4, in turn, with a predetermined interval, the time required for the fourth bit $2^3$ of the counter to reset the circuit 37 will be $1/1000 \times 2^3 = 1/125$ second after the shutter starts moving, and at this time, the AND gate 40 is actuated and the magnet 42 is actuated by the control circuit 41 to close the shutter, thus exposure with 1/125 second will be made.

As has been explained above, according to the present invention such arithmetical digital information (the pulse number from the AND gate) as is obtained by operating the logarithmically compressed information (the output of the amplifier 6) is expanded by a binary counter circuit to obtain shutter speed with multiple series (1/1000 second, 1/500 second, 1/250 second ... 1, 2, 4 ...).

It is possible to provide gate circuits 51 to 54 to AND, the Q output at front stage of the flip-flop circuit and the $\overline{Q}$ output at the latter stage as shown in the drawing for driving the lamp driving circuits 46 to 49 by their outputs, thereby digitally indicating shutter time beforehand with lamp. It is also possible to vary the illuminating color of said indication lamp to facilitate the identification of high speed shutter and low speed shutter.

When the digital diaphragm aperture value information obtained from the AND gate 10 is greater than the marginal diaphragm value of the camera, operation will be as described below.

Suppose the marginal diaphragm aperture value of the register 12 is supplied to the comparator 13, as the pulse is sent from the AND gate 10, the content of the comparator 13 is successively deducted by said pulse and as the content of the comparator 13 becomes 0, the output of the comparator 13 becomes 1. By this, the AND gate 11 is closed and at the same time the AND gate 15 is opened and pulses are sent from the gate 10 through the OR gate 18 to the flip-flop circuit, and the flip-flop circuits are set in turn according to the number of said pulses. On the other hand, since the gate 11 is closed, as mentioned above, such number of pulses as correspond to the marginal diaphragm value will be memorized in the register 19. As the shutter release button is pressed down to its second step, the diaphragm aperture is stopped down to the marginal diaphragm value. And the shutter will be opened for such period of time as corresponds to the diaphragm aperture value obtained after operation. That is, the device in the present invention is so made that in setting shutter speed beforehand, when the diaphragm device is driven by such pulse as corresponds to the set shutter speed and is set to the prescribed value and at the same time the diaphragm aperture value reaches the marginal value, the pulse memorizing device which memorizes the set shutter speed is reset to vary the shutter time. Thus, proper exposure can be obtained for a very wide range of object brightness without any manual operation and it is very effective.

In the former case, explanations were made of the case wherein shutter time is set first, that is, so-called shutter preference, and the invention can naturally be applied to a diaphragm preference camera. Next, a device of the present invention, in which such control circuit is added as enabling the change-over to be made between diaphragm preference and shutter preference, will be explained using FIG. 2. Like parts as those in FIG. 1 will be identified by like numbers.

Figure 2:
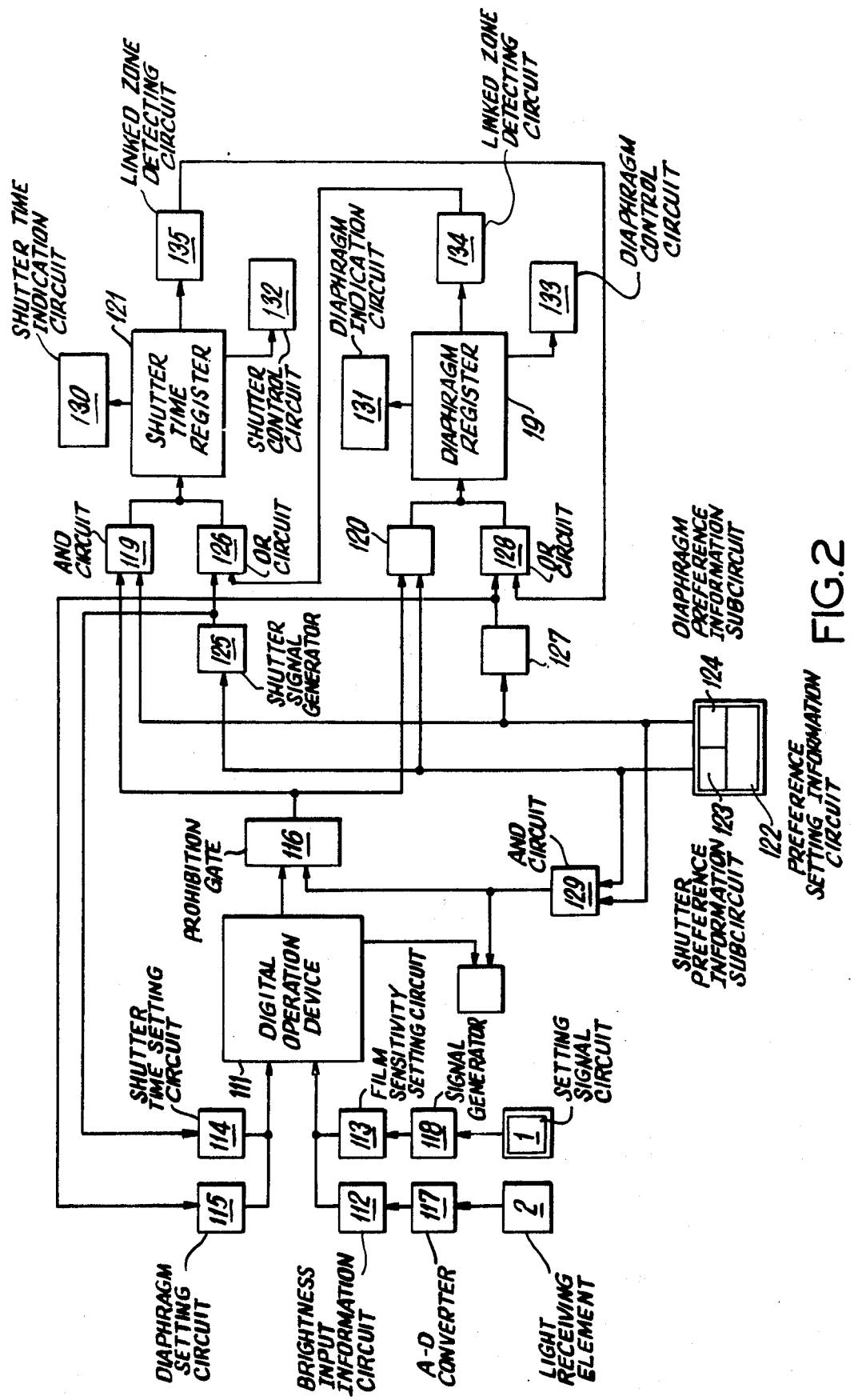
FIG. 2 is a block diagram to show the second example of an electronic exposure control apparatus of the present invention.

In FIG. 2, the outputs of a brightness input information circuit 112, a film sensitivity setting information circuit 113, a shutter time setting information circuit 114, and a diaphragm setting information circuit 115 are connected to the input of a digital operation device 111, and either the proper diaphragm aperture information or shutter time information is outputted from the output of said operation device and passes through a prohibition gate 116 as a number of pulse trains with even intervals as correspond to said set information. The purpose of the brightness input information circuit 112 is to place the light receiving element 2 (consisting of photoconductive element such as CdS cell, PbS cell, etc., or photo-electromotive force element such as photodiode, photo-transistor, etc.) at such position so as to receive the light of an object. The element 2 also is to logarithmically compress the analogue output thereof and impress the same into the input of an AD converter circuit 117 composed of the 7, 8, 9 and 10 in FIG. 1. The A-D converter then converts the same to such linear digital pulse as is proportionate and corresponds to the analogue signal level and impresses the pulse signal thereof into the input of the operation device 111.

The film sensitivity information circuit 113 is, as the information circuit 112, to linearly impress into the operation device 111 through the information circuit 113 itself, the digital pulse signal which is proportional to the film sensitivity by a signal generator 118 which is composed of the elements 7, 8, 9 and 10 shown in FIG. 1 and has a function to A-D convert the analogue signal of the setting signal 1 which sets in the film sensitivity used. The output of the operation device 111 is supplied into a shutter time register 121, a diaphragm register 19 which is composed of the parts 28 to 45 shown in FIG. 1 through AND circuits, 119 and 120 respectively.

On the other hand, the output of a preference setting information circuit 122 is added to the other input of the above-mentioned AND circuit and at the same time a shutter preference information circuit part 123 has such number of pulses, as corresponds to the set shutter time as is added to a shutter information signal generator 125 which is composed of the 7, 8, 9 and 10 shown in FIG. 1, added to the shutter time setting information circuit 114 and the OR circuit 126, and the output of the above-mentioned OR circuit 126 is added to the shutter time register 121.

Similarly, a diaphragm preference information circuit part 124 has such number of pulses, as corresponds to the diaphragm aperture which has been added to a diaphragm information signal generator 127 being composed of the 7 to 10 shown in FIG. 1 and has been set, added to the diaphragm setting information circuit 115 and the OR circuit 128, and the output of the above-mentioned OR circuit 128 is added to the diaphragm register 19.

The contents of the above-mentioned registers are respectively sent to the shutter time indication circuit 130 and the diaphragm indication circuit 131 being composed of the parts 46 to 54 shown in FIG. 1 to indicate the photographing information and at the same time the contents of the information are sent to the shutter control circuit 132 and the diaphragm control circuit 133 respectively, to effect the shutter control and the diaphragm control, respectively, with said content.

The device is so composed that both outputs for shutter, diaphragm of the above-mentioned preference set information circuit are added to the AND circuit and the output sent to the prohibition gate 116, and at the same time the output is sent to a zero signal indication near the operating device. Now, the operation of the circuits will be explained in detail following each preference setting.

(1) In case of shutter preference:

When, for example, the indication marked on shutter dial is made to have the position of A (auto) set at any desired shutter speed by rotating a dial, a signal is issued to the shutter preference setting information circuit 123, and such number of pulses as corresponds to the shutter speed which has been sent to and set at the AND circuits 129, 120 and the shutter time setting information circuit 114.

On the other hand, the brightness input information 112 which supplies such pulses from compressing the output of light receiving element and being AD converted and being in proportion with the logarithm of brightness, and the film sensitivity setting information 113 generated by film sensitivity setting are added to one of the inputs of the operation device 111. The above-mentioned shutter time setting information is added to the other one of the inputs, and from said operation device 111, a proper diaphragm aperture information output AV is outputted as such number of pulse train signal as correspond to the diaphragm aperture information. While the outputted diaphragm aperture signal is sent through the prohibition gate circuit 116 to the AND circuits 119 and 120, and since input is not impressed to one of the AND circuit 119, the signal will not pass through this circuit, but instead passes through the AND circuit 120 and is sent to the diaphragm register. By application of the signal of the diaphragm register, for example, a step motor, etc. is driven and the diaphragm is stopped down. When it falls outside of the linked movement zone of the diaphragm, signal is fed back by a detecting circuit 134 for detecting the association failure and is sent to the OR circuit 126 and reset the once-set shutter time so that proper exposure can be obtained. Of course, it is possible to issue a warning signal only without providing feedback and to reset manually.

(2) In the diaphragm preference case:

As the function of the diaphragm preference is entirely equivalent to the case of shutter preference, with the shutter preference signal, explanations will be omitted. In this case, 135 is a detecting circuit for detecting the association failure (i.e., a link-zone detecting circuit).

(3) In the manual shutter case:

When the shutter dial, the diaphragm ring are set at any desired value except A, EE, respectively, both the shutter preference signal circuit part 123 and the diaphragm preference signal circuit part 124 have their outputs generated and, as has been described above, have resets both the shutter register 121 and the diaphragm register 19. At the same time, signals are sent to the shutter time setting information circuit 114 and the diaphragm setting information circuit 115, and operation is performed other with the brightness input information and the film sensitivity setting information. The output of the operation device will not be sent to the AND circuit as the prohibition gate circuit 116 works thereon. Since the operation device is so composed as to provide zero signal, when the shutter or the diaphragm is operated until the zero signal indication is lighted so that the operation device becomes zero, proper exposure can be made.

As has been explained above, in the electronic shutter control device according to the present invention such pulse number as corresponds to the shutter time obtained by operation of logarithmic information is memorized and it is read out by the read out pulse from the binary (notation) circuit, thereby the shutter speed of multiple series can be precisely and stably obtained, thus the invention has great effect as the most advanced automatic exposure control system.

What is claimed is:

1. An exposure control system for a camera comprising:
    (a) a first circuit for converting the intensity of light into a first analogue signal proportional to the logarithm of said intensity;
    (b) analogue-to-digital conversion means, having an output terminal, connected to said first circuit for generating a number of pulses corresponding to the first analogue signal from said first circuit;
    (c) a plurality of AND circuits, each having input terminals and an output terminal, the output terminal of said analogue-to-digital conversion means being connected to at least one of the input terminals of the AND circuits;
    (d) a plurality of flip-flop circuits connectable at their set input terminal to the output terminal of each of said AND circuits, an output terminal of each flip-flop circuit being connectable to an input terminal of the AND circuit which is connected to the next-stage flip-flop circuit;

(e) a pulse generating means;

(f) a binary counter having a plural number of bits and connected to the output of said pulse generating means, said binary counter for counting a number of pulses from said pulse generating means in association with shutter release, the output of said binary counter resetting the flip-flop circuits after said circuit had been set corresponding to the number of pulses from said analogue-to-digital conversion means;

(g) a comparison means for comparing the outputs of the plurality of the flip-flop circuits with the reset values and generating a control signal when the outputs of the plurality of the flip-flop circuits and the reset values have come into a predetermined relationship;

(h) exposure control means for controlling exposure of film in the camera in response to the control signal from the comparison means;

(i) a limit-diaphragm-value signal generating means which generates a number of pulses corresponding to the limit diaphragm value of the camera;

(j) second comparison means which compares the output pulse number of the limit-diaphragm-value signal generating means with the output pulse number of the analogue-to-digital conversion means, said second comparison means generating a second control signal when the output pulse number of the analogue-to-digital conversion means is greater; and (k) gate means which is made operative by the output of the second comparison means and adds the difference between the two compared pulse numbers to at least one of the plurality of AND circuits.

* * * * *